United States Patent [19]

Kimura et al.

[11] Patent Number: 5,656,396
[45] Date of Patent: Aug. 12, 1997

[54] ALKALINE STORAGE BATTERY

[75] Inventors: Tadao Kimura, Kobe; Katsunori Komori, Kadoma; Hiromu Matsuda, Hyogo-ken; Yoshinori Toyoguchi, Yao; Hiromi Kajiya, Toyohashi, all of Japan

[73] Assignee: Matsushita Electric Industrial Co., Ltd., Osaka, Japan

[21] Appl. No.: 649,290

[22] Filed: May 17, 1996

[30] Foreign Application Priority Data

Jun. 2, 1995 [JP] Japan ................................. 7-137026

[51] Int. Cl.⁶ ..................................................... H01M 4/72
[52] U.S. Cl. .......................... 429/241; 429/243; 429/233
[58] Field of Search ............................ 429/59, 101, 218, 429/233, 236, 241, 243, 244, 60

[56] References Cited

U.S. PATENT DOCUMENTS

| | | |
|---|---|---|
| 3,505,115 | 4/1970 | McBreen . |
| 4,189,533 | 2/1980 | Sugalski ................................ 429/233 |
| 5,053,292 | 10/1991 | Hasebe et al. ....................... 429/101 |
| 5,322,746 | 6/1994 | Wainwright .......................... 429/60 |
| 5,348,822 | 9/1994 | Ovshinsky et al. . |
| 5,498,496 | 3/1996 | Sasaki et al. ........................ 429/233 |
| 5,527,638 | 6/1996 | Kinoshita et al. ................... 429/101 |

FOREIGN PATENT DOCUMENTS

| | | |
|---|---|---|
| A0419221 | 3/1991 | European Pat. Off. . |
| A0632513 | 1/1995 | European Pat. Off. . |
| 4-121949A | 4/1992 | Japan . |

OTHER PUBLICATIONS

Patent Abstracts of Japan, vol. 011, No. 338 (E-553), 5 Nov. 1987; JP-A-62 119876 (Shin Kobe Electric Mach. Co., Ltd.), 1 Jun. 1987.

Primary Examiner—M. Nuzzolillo

[57] ABSTRACT

The invention provides long life alkaline storage batteries free from short-circuiting using plates having a punching metal as a substrate. In the alkaline storage batteries of the present invention, at least one of the positive plate and the negative plate comprises a punching metal as a substrate, the size thereof is different from that of another plate, and the plates are arranged so that the cut side of the plate having the punching metal substrate at which the substrate is cut through the punched portions does not overlap the side of the adjacent plate of opposite polarity. The plates having such a construction prevents needle-shaped projections produced by cutting the substrate through the punched portions from causing the short-circuiting with the adjacent plate of opposite polarity.

9 Claims, 1 Drawing Sheet

ALKALINE STORAGE BATTERY

BACKGROUND OF THE INVENTION

1. Field of the Invention

The present invention relates to alkaline storage batteries, particularly, to the improvement of the construction of the plates used therein.

2. Description of Related Art

Since alkaline storage batteries are higher in energy density than lead acid batteries and, furthermore, can be sealed and have a long life, the field of utilization thereof has been increasingly expanded as electric sources of medium capacity for vehicles such as electromotive bicycles and electric cars in addition to portable devices such as mobile communication devices and small audio devices.

As the plates for alkaline storage batteries, there are sometimes used those which comprise a three-dimensional porous substrate such as a felt-like metal or a spongy metal on which an active material is supported, but mainly used are those which comprise a planar substrate such as a punching metal on which an active material is supported with a binder or on which an active material is coated and, then, sintered. This is because the punching metal substrates are inexpensive as compared with the three-dimensional porous substrates and, furthermore, various filling methods for the active material can be employed in the case of the punching metal substrates. Usually, the plates comprising a punching metal substrate are made by filling the substrate with an active material, then, subjecting it to a pressing, etc., and cutting it to a plate size. Thereafter, the plates are inserted in a container together with separators and the plates of opposite polarity, and the container is filled with an electrolyte and sealed to obtain a battery.

SUMMARY OF THE INVENTION

In the case of an ordinary punching metal being used as a substrate, when the substrate having the active material is cut to the plate, the substrate is cut including some of the punched holes, resulting in formation of needle-shaped projections, unless a very complicated and special technique is employed. In case the active material is firmly bound to the substrate, the projections are covered with the active material and are in the direction parallel to the plate surface, and, therefore, there are no special problems. However, if the active material around the projections falls off due to the swelling of the binder or expansion or contraction of the active material particles per se, the projections are bent or curved in the direction perpendicular to the plate surface and pierce through the separator to cause a short circuit with the adjacent plate of opposite polarity.

Such short-circuiting does not occur just after the fabrication of batteries, but occurs after the batteries have been subjected to a certain number of charge-discharge cycles. Thus, it is difficult to know the occurrence of the short-circuiting beforehand and the short-circuiting causes a considerable reduction in reliability of batteries.

For solving these problems, there are employed the methods of increasing the amount of the binder or using strong separators or thick separators. However, all of these methods increase the resistivity between the plates of batteries and this results in deterioration of discharge characteristics.

The object of the present invention is to provide a battery constructed of plates made using a punching metal as a substrate which does not cause short-circuiting owing to the projections of the substrate formed at the cut portion of the plates.

DETAILED DESCRIPTION OF PREFERRED EMBODIMENT

Figure 1:
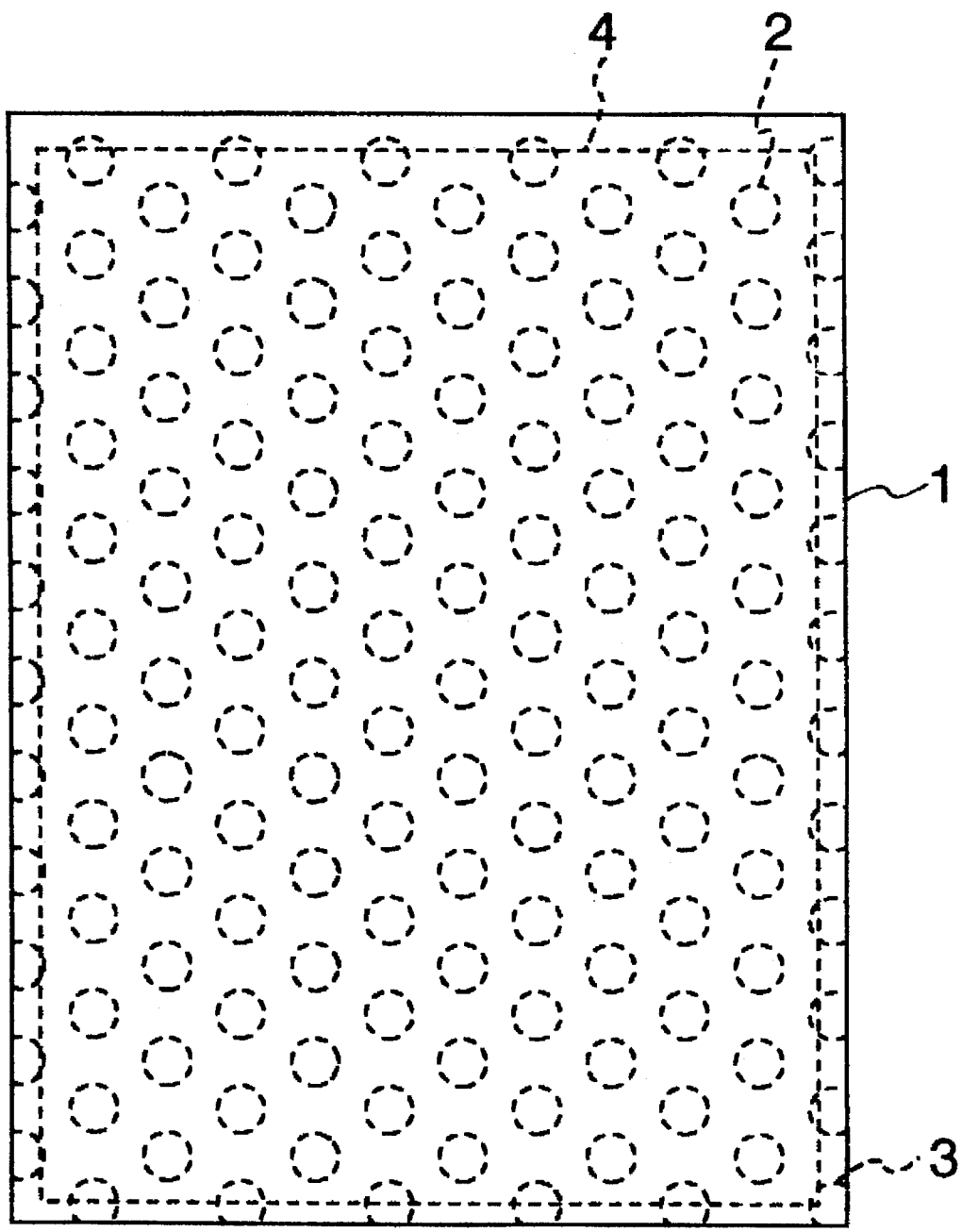
FIG. 1 is a schematic diagram which shows a positional relation of the plates in an example of the present invention.

The alkaline storage battery of the present invention has positive plates, negative plates, separators which separate the positive and negative plates from each other, and an alkaline electrolyte, wherein the negative plates and/or the positive plates are composed of punching metal substrates coated with an active material, the plates of one polarity are larger than those of another polarity, and the plates are arranged so that the cut side of the plate having a punching metal substrate at which the punching metal substrate is cut through the punched portions (namely, the punching metal substrate is cut through the punched portions and, as a result, the plate has a dented side) does not overlap the cut side of the adjacent plate of opposite polarity.

The present invention further includes such construction that the negative plate comprises a punching metal coated with an active material mixture mainly composed of a hydrogen-absorbing alloy.

The present invention further includes the construction that a plurality of positive plates alternating with a plurality of negative plates are stacked with separators between adjacent plates of opposite polarity and are inserted in a rectangular container.

By the above construction, occurrence of the short-circuiting caused by the projections of the substrate at the cut side of the plates can be effectively prevented. First, in such construction that the plate comprising a punching metal substrate coated with an active material is smaller than the adjacent plate of opposite polarity separated by a separator from the former plate and the cut side of the plates at which the punching metal substrate is cut through the punched portions does not overlap the cut side of the adjacent plates of opposite polarity, the short-circuiting can be prevented as shown below. That is, the active material present in the vicinity of the cut side at which the punching metal plate is cut through the punched portions is pressed by the adjacent plate separated by the separator, and, therefore, falling off of the active material which occurs due to expansion and contraction of the active material per se or deterioration in performance of binder by the repetition of charging and discharging can be more effectively prevented, and, as a result, the projections formed at the cut side of the plates by cutting the punching metal plate through the punched portions can be prevented from being bent or curved in the direction perpendicular to the plate surface and further prevented from piercing through the separator and causing a short-circuit with the adjacent plate of opposite polarity.

Next, in such construction that the plate comprising a punching metal substrate coated with an active material is larger than the adjacent plate of opposite polarity, a separator being provided therebetween, and the side of the punching metal substrate at which the substrate is cut through the punched portions does not overlap the side of the adjacent plate of opposite polarity, the active material present in the vicinity of the side at which the punching metal substrate is cut through the punched portions falls off due to expansion and contraction of the active material per se or deterioration in performance of the binder by the repetition of charge and discharge and, thus, the projections at the side of the plate formed by cutting the punching metal substrate through the punched portions are exposed. However, even if they are bent or curved in the direction perpendicular to the plate surface and pierce through the separator, the adjacent plate is not present at that position and no short-circuit occurs.

In the case of the negative plate comprising a punching metal coated with an active material mixture mainly composed of a hydrogen-absorbing alloy, the hydrogen-absorbing alloy has the feature that the particles of the alloy become finer due to the occlusion and release cycle of hydrogen brought about by charging and discharging. For this reason, the active material more strongly falls off from the cut side face of the plate than in the case of cadmium negative plate or zinc negative plate. According to the present invention, by the above action, the falling off of the active material is inhibited or the short-circuiting caused by the projections on the side formed by cutting the punching metal substrate through the punched portions after falling off of the active material can be prevented, and, therefore, the effect to prevent short-circuit is further greatly exhibited.

Furthermore, in the case of an alkaline storage battery where a plurality of positive plates and a plurality of negative plates are stacked and the container has a rectangular shape, the total extension length of the side at which the punching metal substrate is cut through the punched portions is very large and, especially, there are many corner parts where the projections are conspicuously formed by cutting the punching metal substrate through the punched portions, and, as a result, the effect to prevent the short-circuit is considerably great.

The present invention will be explained in more detail by the following examples.

The positive plate was made by filling a spongy nickel substrate having a porosity of 95% and an areal density of 600 g/m$^2$ with a paste prepared by adding water to an active material mixture mainly composed of nickel hydroxide, drying the filled substrate, then, press molding the substrate to a thickness of 1 mm and cutting it to a size of 90×100 mm. The plate had a capacity density of about 600 mAh/cc and a capacity of 5.4 Ah.

The negative plate was made by coating a nickel punching metal substrate having a thickness of 100 μm, a pore diameter of 2 mm and an opening rate of 40% with a paste prepared by adding water and an emulsion of styrene-butadiene rubber to MmNi$_5$ type hydrogen-absorbing alloy ground to a particle size of 100 μm or less, drying the paste and, then, press molding the coated substrate to a thickness of 0.8 mm. The capacity density of this plate was 1300 mAh/cc. The plate was cut to a size of 100×105 mm to obtain a negative plate (a), to a size of 85×95 mm to obtain a negative plate (b), and to a size of 90×100 mm to obtain a comparative negative plate (c). These plates (a), (b) and (c) had a capacity of 10.9 Ah, 8.4 Ah and 9.4 Ah, respectively.

A nickel current collector was spot welded to each of the above positive plates and negative plates. Then, ten positive plates and eleven negative plates were alternately stacked together with separators of 0.2 mm thick between the adjacent positive and negative plates so that the outermost plate was a negative plate. Thus, a plate group was obtained.

As for the plate group in which the negative plates (a) were used, the negative plates and the positive plates were stacked so that all sides of the negative plate 1, which is covered with an active material, were positioned outside the adjacent positive plate 4 at a distance of at least 2 mm from the four sides of the positive plate 4 as shown in FIG. 1. In this case, needle-shaped projection 3 formed by cutting the plate through the punched hole 2 of the punching metal substrate was at such position that even if the projection is curved or bent, it does not contact with the adjacent plate of opposite polarity. As for the plate group in which the negative plates (b) were used, similarly, the negative plates and the positive plates were stacked so that all sides of the negative plate were positioned inside the adjacent positive plate at a distance of at least 2 mm from the sides of the positive plate. For the plate group in which the comparative conventional negative plates (c) were used, the negative plates and the positive plates were stacked so that all sides of the negative plate overlap those of the adjacent positive plate.

As the current collector, each of the positive plates and the negative plates was spot welded to a nickel pole, which was used as the electrode. This plate group was inserted in a polypropylene container having an inner size of 150 mm in height, 120 mm in width and 25 mm in thickness and this container was filled with 150 cc of an aqueous potassium hydroxide solution having a specific gravity of 1.3 g/cc as an electrolyte and, then, the container was sealed to obtain a sealed battery.

The batteries made using the negative plates (a), (b) and (c) are called A, B and C, respectively. One hundred each of the batteries A, B and C were made.

Cycle life test was conducted on these batteries in an atmosphere of 25° C. As for the conditions of charging and discharging, one cycle consisted of charging with a current of 25 A for 2.5 hours, resting for 0.5 hour, discharging with a current of 25 A to a cell voltage of 1 V, and resting for 0.5 hour.

Table 1 shows the number of batteries in which short-circuiting occurred in the cycle life test.

TABLE 1

| Battery | | The number of cycles | | | | |
|---|---|---|---|---|---|---|
| | | 100 | 200 | 300 | 400 | 500 |
| A | The number of short-circuiting batteries | 0 | 0 | 0 | 0 | 1 |
| | Short-circuiting percentage (%) | 0 | 0 | 0 | 0 | 1 |
| B | The number of short-circuiting batteries | 0 | 0 | 0 | 0 | 2 |
| | Short-circuiting percentage (%) | 0 | 0 | 0 | 0 | 2 |
| C | The number of short-circuiting batteries | 3 | 9 | 15 | 26 | 34 |
| | Short-circuiting percentage (%) | 3 | 9 | 15 | 26 | 34 |

No short-circuiting occurred just after the electrolyte filling in any of batteries A, B and C. However, as for the comparative batteries C, 3% of them caused short-circuiting after termination of 100 cycles and 9% of them caused short-circuiting after termination of 200 cycles. These batteries were disassembled and the short-circuiting portions were examined to find that in all of the portions, needle-shaped projections produced at the cut portions of the punching metal substrate of the negative plate were curved and pierced the separator to contact with the adjacent plate of opposite polarity. When the cycle test was further progressed, short-circuiting occurred in 34% of the batteries C after termination of 500 cycles. These batteries were also disassembled and examined to find that the short-circuiting occurred for the same reason as above.

On the other hand, in the batteries A and B of the present examples, no short-circuiting occurred until 400 cycles and it is clear that the effect of the present invention is markedly great. After termination of 500 cycles, one of the batteries A and two of the batteries B caused short-circuiting. These batteries were disassembled and the short-circuiting portions were examined, but there were no portions where the plates directly contacted with each other, and carbonization due to dendritic short-circuiting was seen at the position of the separator near the center of the plate, and, as a result, it was found that the short-circuiting in the batteries A and B is caused by the dendritic short-circuiting resulting from the deposition of dissolved metals on the separator. That is, the short-circuiting caused by the projections at the cut surface of the punching metal substrate was able to be completely prevented.

In the above example, explanation is given on the battery system where nickel hydroxide was used as a positive plate active material and a hydrogen-absorbing alloy was used as a negative plate active material and, furthermore, a punching metal was used as a negative plate substrate, but the present invention is not limited to the above combination, and prevention of short-circuit can be attained by the same action in all of alkaline storage batteries where punching metal substrate is used as a substrate of at least one of the positive plate and the negative plate.

Furthermore, in the above example, explanation is made on rectangular batteries comprising a plurality of positive plates and a plurality of negative plates which are stacked, but the short-circuiting can be prevented by the same action also in cylindrical batteries comprising a cylindrical container in which are inserted one positive plate and one negative plate which are rolled with a separator between the plates.

As explained above, according to the present invention, alkaline storage batteries which do not cause short-circuiting due to the repetition of charge-discharge cycle without deteriorating the discharge characteristics using separators of high mechanical strength or by fixing the active materials with a large amount of binders can be obtained even with use of the plates comprising punching metal substrates.

The effect of the present invention is conspicuous in alkaline storage batteries which use negative plates comprising a punching metal on which a hydrogen-absorbing alloy is supported, these batteries usually suffering from the severe problem that the hydrogen-absorbing alloy as active material per se becomes fine powders due to the repetition of charge-discharge cycle and falls off from the plate.

Furthermore, the effect of the present invention is conspicuous in alkaline storage batteries comprising a rectangular container and a plurality of positive plates and a plurality of negative plates which are alternately stacked and in which the total extension length of the sides at which the punching metal substrate is cut through the punched portions is very great and, especially, there are many corner parts where the needle-shaped projections are conspicuous at the cut sides.

What is claimed is:

1. An alkaline storage battery which comprises positive plates having a positive polarity, the positive plates comprising sides, negative plates having a negative polarity, the negative plates comprising sides, at least one of the positive plates being adjacent at least one of the negative plates, separators separating the adjacent plates of opposite polarity from each other, and an alkaline electrolyte, wherein at least one set of the plates is selected from the group consisting of the positive plates and the negative plates, each plate of the set comprises a punched metal substrate defining punched portions and coated with an active material, at least one of the sides of each plate of the set comprising the substrate coated with the active material is a cut side which is cut through a number of the punched portions, the plates of one polarity are larger than the plates of the opposite polarity, and the cut side does not overlap the side of the adjacent plate of opposite polarity.

2. An alkaline storage battery according to claim 1, wherein the negative plate comprises the punched metal substrate coated with the active material and the active material is a mixture mainly composed of a hydrogen-absorbing alloy.

3. An alkaline storage battery according to claim 1, wherein a plurality of the positive plates and a plurality of the negative plates are stacked so that the positive plates alternate with the negative plates with separators being put between the adjacent plates of opposite polarity and the stacked plates are inserted in a rectangular container.

4. An alkaline storage battery according to claim 2, wherein a plurality of the positive plates and a plurality of the negative plates are stacked so that the positive plates alternate with the negative plates with separators being put between the adjacent plates of opposite polarity and the stacked plates are inserted in a rectangular container.

5. The alkaline storage battery of claim 1, wherein the positive and negative plates are coated with respective active material.

6. The alkaline storage battery of claim 1, wherein the positive and negative plates comprise punched metal substrate to define the punched portions.

7. The alkaline storage battery of claim 6, wherein at least one of the sides of each of the positive and negative plates is the cut side which is cut through a number of the punched portions.

8. The alkaline storage battery of claim 1, wherein the positive plates and the negative plates are stacked.

9. The alkaline storage battery of claim 1, wherein the positive plate comprises a spongy metal and the negative plate comprises the punched metal.

* * * * *